(12) United States Patent
Lee

(10) Patent No.: US 9,104,644 B2
(45) Date of Patent: Aug. 11, 2015

(54) OPERATING METHOD OF SOFTWARE FAULT-TOLERANT HANDLING SYSTEM

(71) Applicant: Electronics and Telecommunications Research Institute, Daejeon (KR)

(72) Inventor: Kwang Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/833,473

(22) Filed: Mar. 15, 2013

(65) Prior Publication Data

US 2014/0089731 A1    Mar. 27, 2014

(30) Foreign Application Priority Data

Sep. 25, 2012   (KR) .................... 10-2012-0106752

(51) Int. Cl.
 *G06F 11/00*   (2006.01)
 *G06F 11/20*   (2006.01)

(52) U.S. Cl.
 CPC .......... *G06F 11/202* (2013.01); *G06F 11/2028* (2013.01); *G06F 11/2038* (2013.01); *G06F 11/2097* (2013.01)

(58) Field of Classification Search
 CPC .............. G06F 11/202; G06F 11/2028; G06F 11/2097; G06F 11/2038; G06F 11/07; G06F 11/0721; G06F 11/0724; G06F 11/14; G06F 11/1458; G06F 11/20
 USPC .......................... 714/47.3, 10, 13, 38.1, 47.1
 See application file for complete search history.

(56) References Cited

U.S. PATENT DOCUMENTS

| | | |
|---|---|---|
| 5,235,700 A | 8/1993 | Alaiwan et al. |
| 6,035,415 A * | 3/2000 | Fleming ........................ 714/11 |
| 2003/0005356 A1* | 1/2003 | Franckowiak et al. ......... 714/11 |
| 2003/0097610 A1* | 5/2003 | Hofner ............................ 714/10 |
| 2008/0201602 A1* | 8/2008 | Agarwal et al. .................. 714/4 |
| 2011/0191627 A1* | 8/2011 | Koning et al. ................. 714/5.1 |

FOREIGN PATENT DOCUMENTS

KR   10-2003-0074982 A   9/2003

* cited by examiner

*Primary Examiner* — Joseph D Manoskey
(74) *Attorney, Agent, or Firm* — William Park & Associates Ltd.

(57) ABSTRACT

An exemplary embodiment provides an operating method of a software fault-tolerant handling system, and more particularly, to an operating method of a fault-tolerant handling system in which a fault recovery is easy in a fault-tolerant technology of copying with various faults which can occur in a computing device.

5 Claims, 11 Drawing Sheets

OPERATING METHOD OF SOFTWARE FAULT-TOLERANT HANDLING SYSTEM

CROSS-REFERENCE TO RELATED APPLICATIONS

This application claims priority to and the benefit of Korean Patent Application No. 10-2012-0106752 filed in the Korean Intellectual Property Office on Sep. 25, 2012, the entire contents of which are incorporated herein by reference.

TECHNICAL FIELD

An exemplary embodiment of the present invention relates to an operating method of a software fault-tolerant handling system, and more particularly, to an operating method of a fault-tolerant handling system in which a fault recovery is easy in a fault-tolerant technology of copying with various faults which can occur in a computing device.

BACKGROUND ART

A fault-tolerant handling method in the related art as a method of applying a hardware fault-tolerant handling method primarily adopts a technique of performing error detection handling and performing error masking handling with respect to an error hardware module by using a voting module, through hardware multiplexing, that is, multiplexing of a CPU and peripheral I/O devices. However, there was a problem in which the method cannot be easily applied to a change in hardware technology due to hardware dependency.

Contrary to this, a software-type fault-tolerant handling method is presented and the fault is generally recovered by implementing check point handling, heartbeat handling, switch-over handling, and primary processor recovery handling functions in individual application processes. For example, when an application process A is generated in a processor 1 (primary processor), an application process A' is generated in a processor 2 (backup processor). This process is called a checkpoint. Simultaneously, a message (heartbeat), "I'm alive" is given to other processors in all application processors every second and if this message is not received for several seconds, it is recognized that the fault occurs in the corresponding processor. If the processor 1 cannot execute the application process A due to the occurrence of the fault, the processor 2 senses the case to perform A' which is a backup application process. In this case, the application process A' continuously performs the checkpoint while A" which is a backup process of the application process A' is performed in a processor 3. The processor 1 may perform a recovering operation during the process.

However, in a first problem of this method, the application process A directly periodically makes the checkpoint to generate the application process A' and a concept of the checkpoint is simple, but a high-level program technology is required to perform programming in the process. Further, users who actually use the corresponding system do not prefer to insert a code for the checkpoint into the application process due to security and safety. For example, when a process of making a bank account is performed in a computing system of a bank, and only a binary is provided without a source code, if a checkpoint function needs to be directly added to the inside of a back account program for fault-tolerant handling, the checkpoint function will not be used in spite of a good function. In a second problem, the processor 1 generates a checkpoint image, and thus the processor 2 transfers the entire checkpoint image to generate the process A'. There may be no problem if the number of images of the process A is one, but the processor 1 has a plurality of application processes in the actual system and a lot of time is required to transfer the information thereof to the processor 2. In a last problem, three processors are physically required. This causes a structure in which inexpensive equipment needs to be manufactured for fault-tolerant handling.

SUMMARY OF THE INVENTION

An exemplary embodiment has been made in an effort to provide an operating method of a software fault-tolerance handling system in which a fault recovery is easy in a fault-tolerant technology of coping with various faults which can occur in a computing device.

An exemplary embodiment provides an operating method of a software fault-tolerance handling system, including: setting a mode of a first processor to an active mode and a mode of a second processor to a standby mode between the first and second processors in accordance with a setting reference; performing a self healing function to recover a system error which occurs in the first processor or transmitting a heartbeat message to the second processor when the system error does not occur; generating a diff app_context between a basic app_context for a predetermined process which is being executed in the first processor and an app_context at a current time and transmitting the generated diff app_context to the second processor, after the transmission; and switching the mode of the first processor to the standby mode and switching the mode of the second processor to the active mode when a current state of the first processor meets a second reference to continuously execute the predetermined process, at the time of transmitting the diff app_context.

An operating method of a software fault-tolerant handling system according to an exemplary embodiment has an advantage in that a recovery image for a fault recovery may be stored by generating and transmitting a minimum capacity of diff app context by using an independent type fault-tolerant handling demon, and a checkpoint time interval may be reduced. thereby achieving a precision roll-back recovery.

Further, the operating method of the software fault-tolerant handling system according to the exemplary embodiment has an advantage in that app context images of application processes may be stored and reexecuted by using the independent type fault tolerant handling demon.

In addition, the operating method of the software fault-tolerant handling system according to the exemplary embodiment has an advantage in that safe switch-over handling and efficient resource management may be performed by alternately performing an active mode and a standby mode with only two units of primary and backup processors.

Moreover, in the operating method of the software fault-tolerant handling system according to the exemplary embodiment, a switching overhead between the primary and backup processors may be additionally reduced by recovering with self-healing function internal errors such as temporary termination of the application process due to not critical faults such as an OS kernel fault, a network card fault, and the like but errors such as SEGV, and the like, in an active system.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
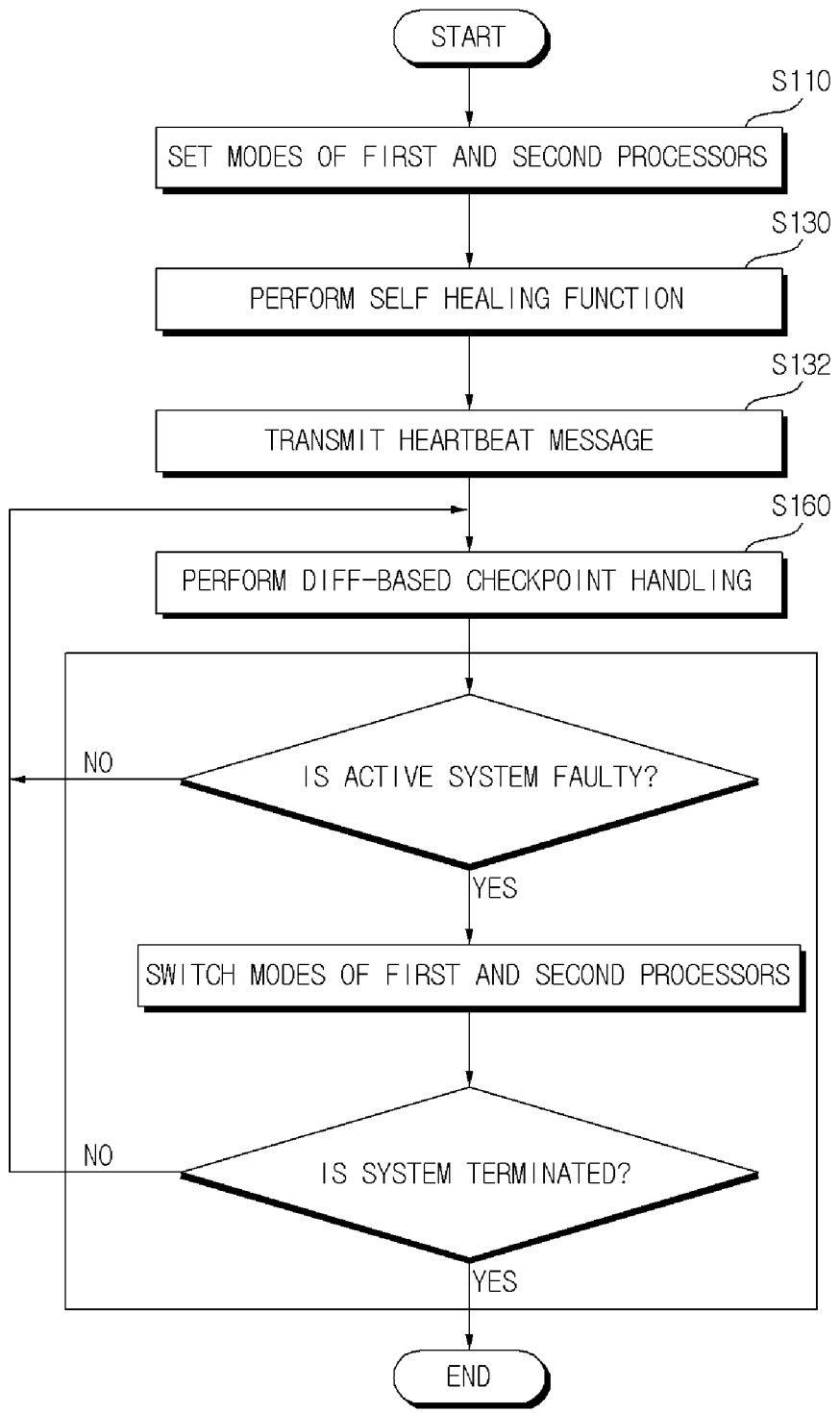
FIG. 1 is a flowchart schematically illustrating an operating method of a software fault-tolerant handling system according to an exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In describing components of an exemplary embodiment, different reference numerals may refer to components of the same name depending on drawings and the same reference numeral may refer to the components of the same name in different drawings. However, even in this case, corresponding components have different functions or the corresponding components do not have the same functions in different exemplary embodiments, and functions of the respective components will be determined based on a description of the respective components in the corresponding exemplary embodiment.

Further, in describing the exemplary embodiment, when it is determined that the detailed description of the known art related to the present invention may obscure the gist of the present invention, the detailed description thereof will be omitted.

In addition, in describing the components of the exemplary embodiment, terms such as first, second, A, B, (a), (b), and the like may be used. The terms are used to just distinguish the component from other components and the essence, sequence, or order of the corresponding component is not limited. When it is disclosed that any component is "connected", "coupled", or "link" to other components, it should be understood that the component may be directly connected or linked to other components, but another component may be "connected", "coupled", or "linked" between the respective components.

A photo-acoustic tomography according to exemplary embodiments of the present invention will be described with reference to the accompanying drawings.

When it is determined that the detailed description of the known art related to the present invention may obscure the gist of the present invention, the detailed description thereof will be omitted.

In the exemplary embodiments, components and features of the present invention are combined with each other in a predetermined pattern. Each component or feature may be considered to be selective as long as not particularly explicitly mentioned. Each component or feature may be implemented in such a way that the corresponding component or feature is not combined with another component or feature. Some components and/or features are combined with each other to configure the exemplary embodiments of the present invention. The order of operations described in the exemplary embodiments of the present invention may be changed. Some component or feature of a predetermined exemplary embodiment may be included in another exemplary embodiment or may be replaced by a corresponding component or feature of another exemplary embodiment.

The exemplary embodiments of the present invention may be implemented through various means. For example, the exemplary embodiments may be implemented through hardware, firmware, software, or combinations thereof.

In the case of implementation of hardware, a method according to the exemplary embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

In the case of implementation of the firmware or software, the method according to the exemplary embodiments of the present invention may be implemented by modules, procedures, or functions that perform the aforementioned functions or operations. A software code is stored in a memory unit to be driven by a processor. The memory unit is positioned in or outside the processor to transmit and receive data to and from the processor by various means which have already been known.

Specific terms used in the following description are provided to help understanding the present invention and the use of the specific terms may be changed to another pattern within a scope without departing from the spirit of the present invention.

Hereinafter, parts required to understand an operation and an action of an operating method of a fault-tolerance handling system according to an exemplary embodiment will be described in detail with reference to the accompanying drawings.

Figure 2:
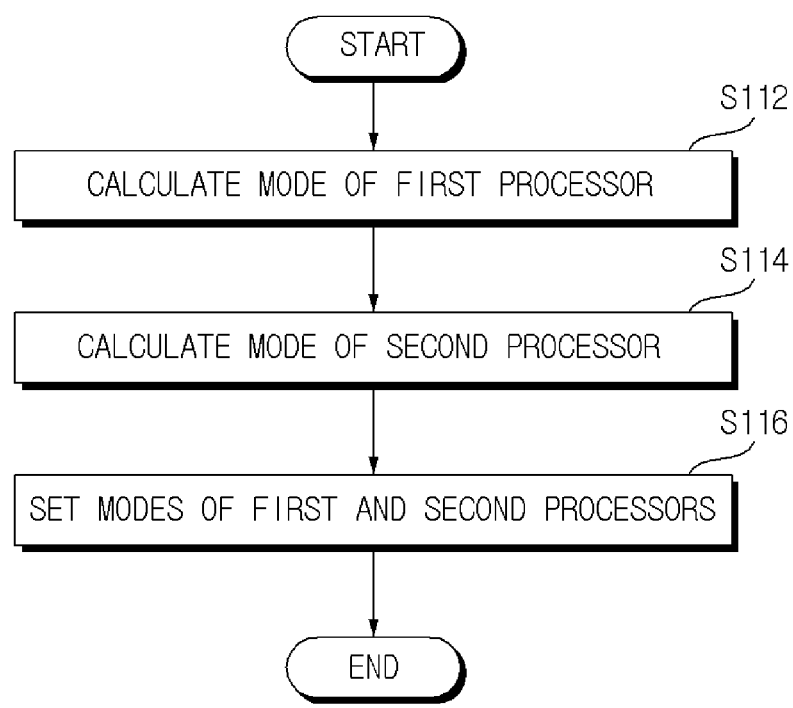
FIG. 2 is a flowchart, in detail, illustrating an operating method for mode setting of a first processor illustrated in FIG. 1.
Figure 3:
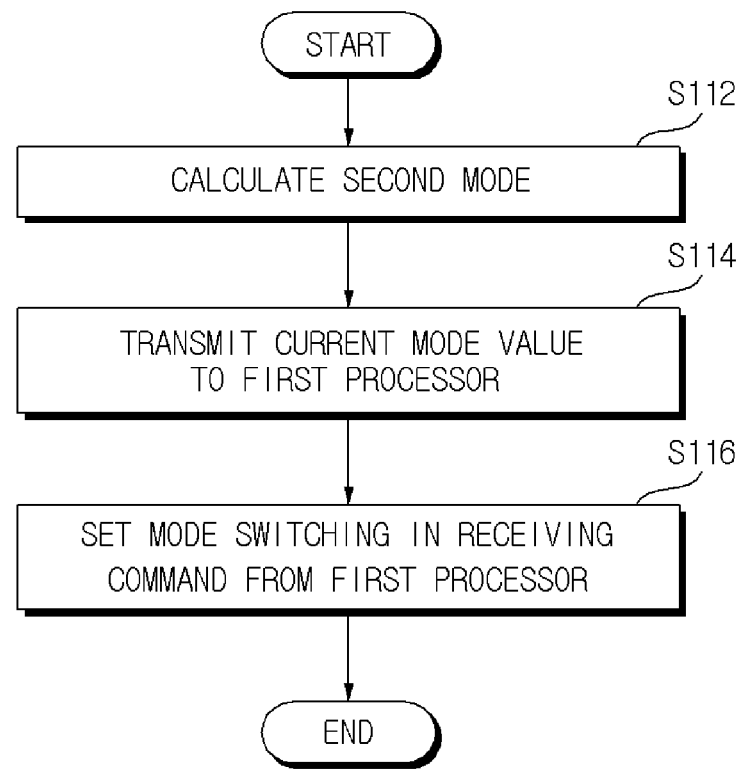
FIG. 3 is a flowchart illustrating an operating method for mode setting of a second processor illustrated in FIG. 1.
Figure 4:
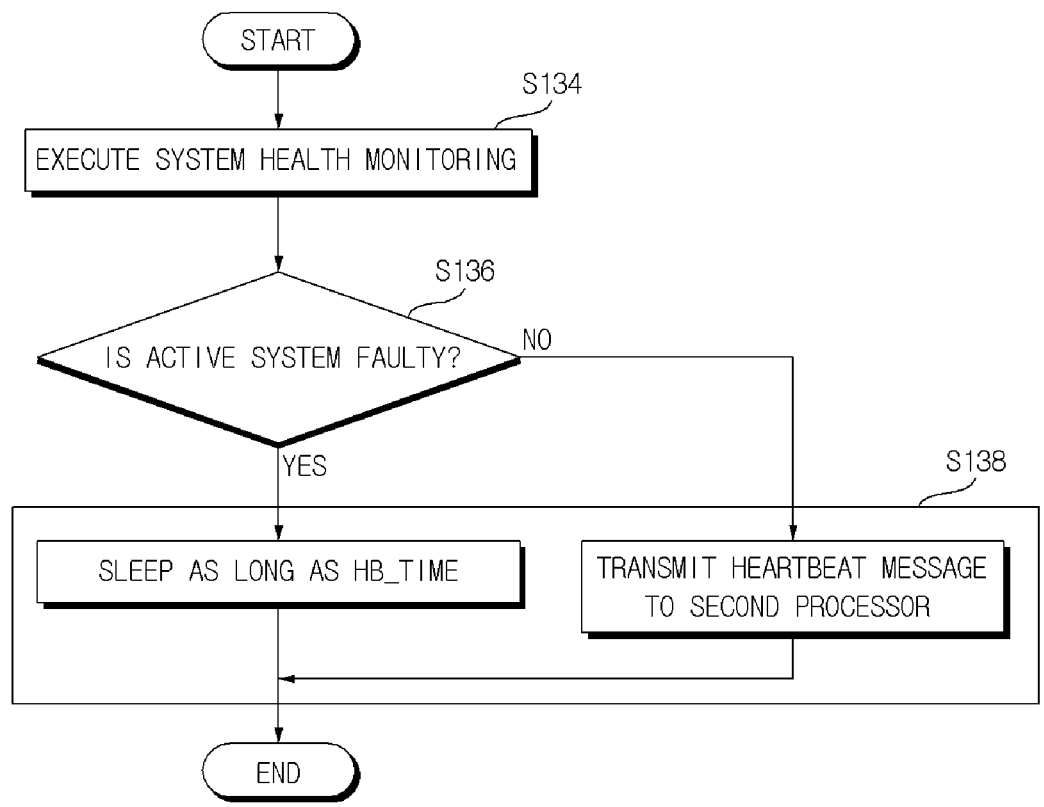
FIG. 4 is a flowchart illustrating an operating method for monitoring and message handling in the first processor illustrated in FIG. 1.
Figure 5:
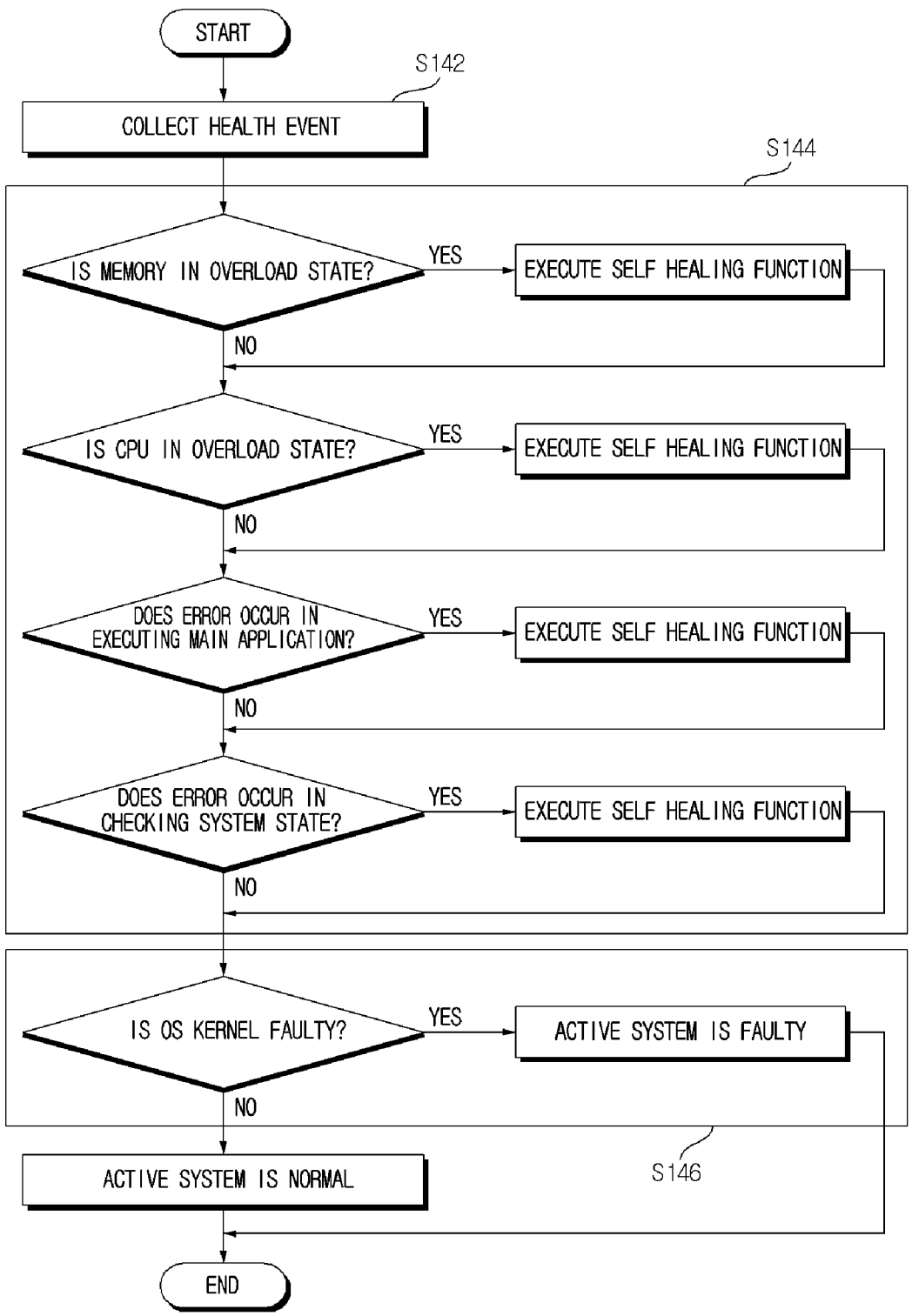
FIG. 5 is a flowchart illustrating an operating method for a monitoring step illustrated in FIG. 4.
Figure 6:
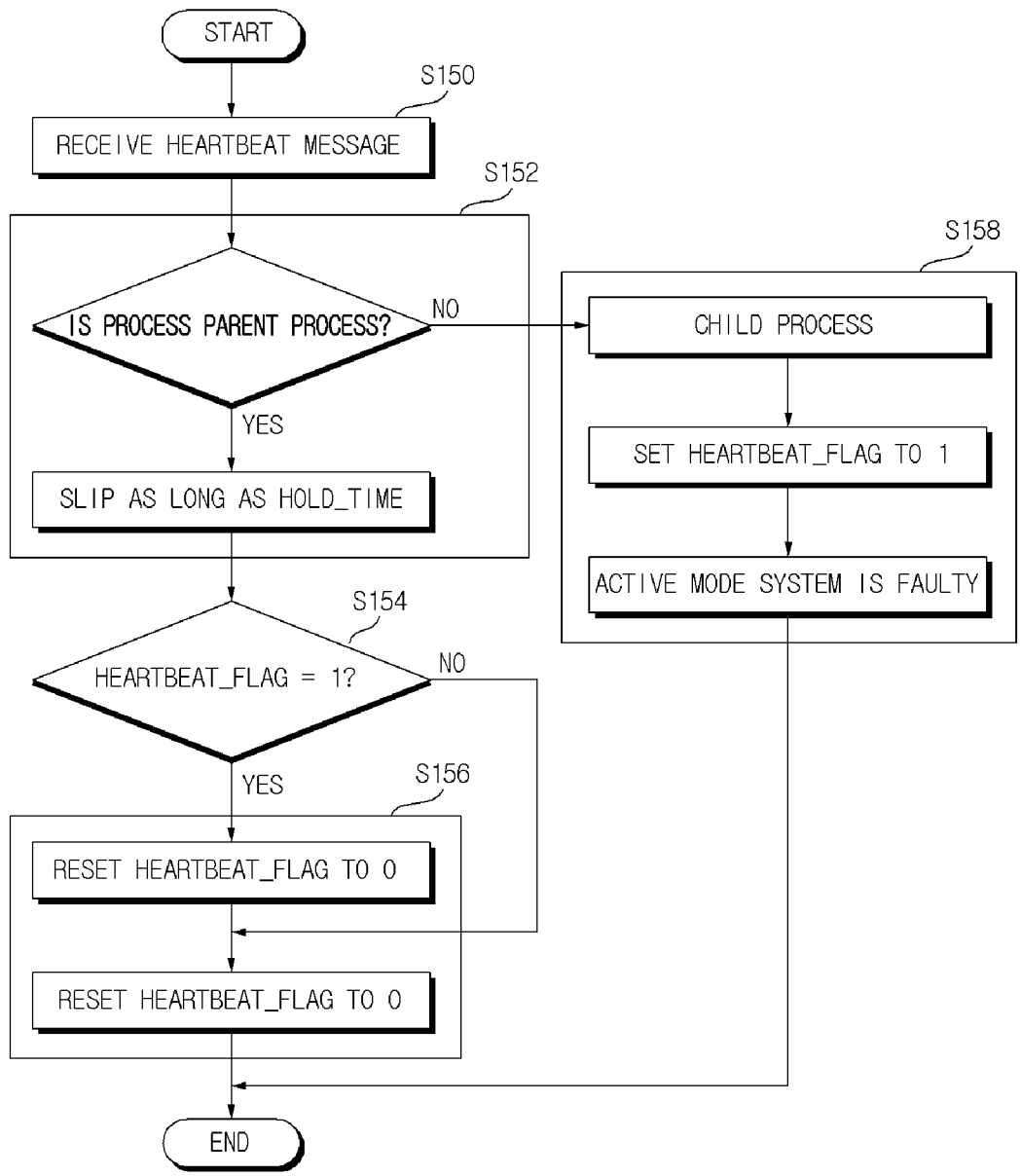
FIG. 6 is a flowchart illustrating an operating method for monitoring and message handling in a second processor illustrated in FIG. 1.
Figure 7:
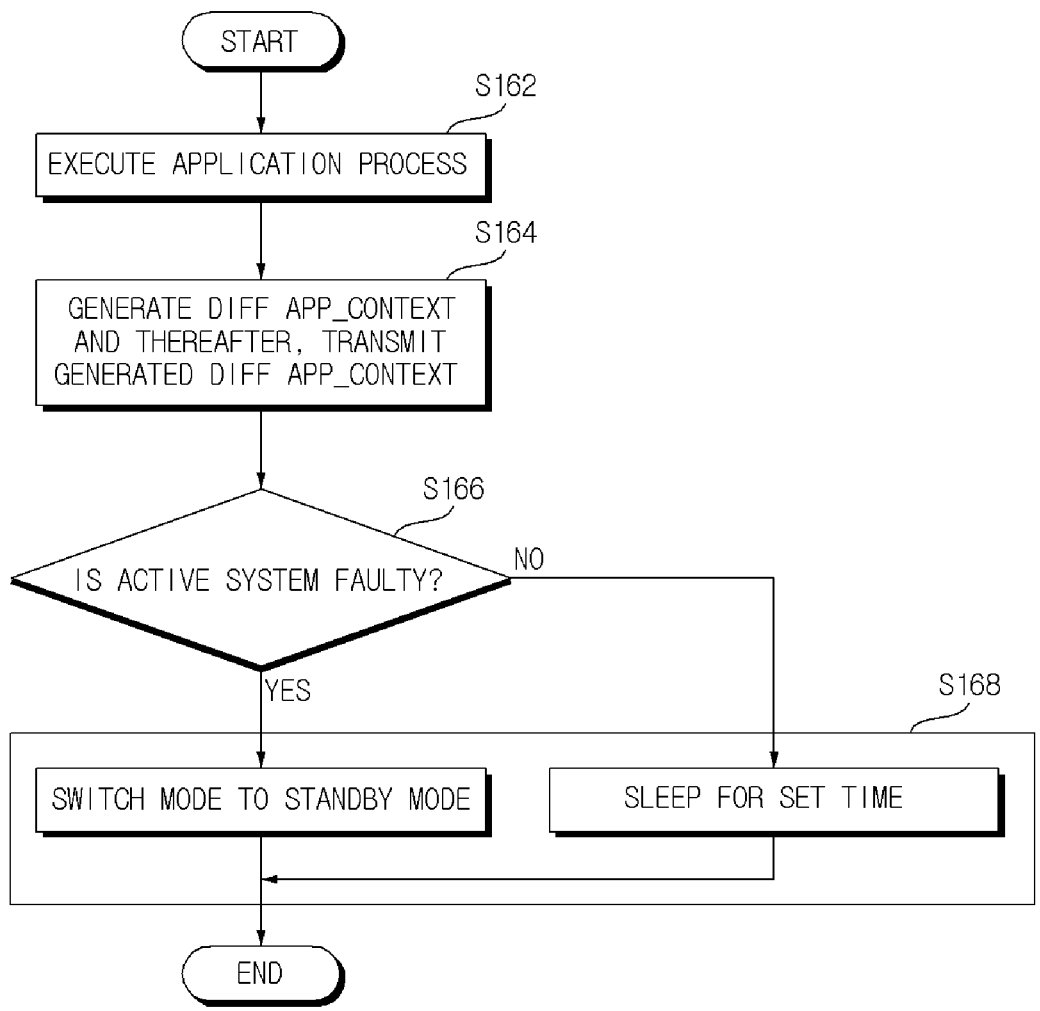
FIG. 7 is a flowchart illustrating an operating method for checkpoint handling illustrated in FIG. 1.
Figure 8:
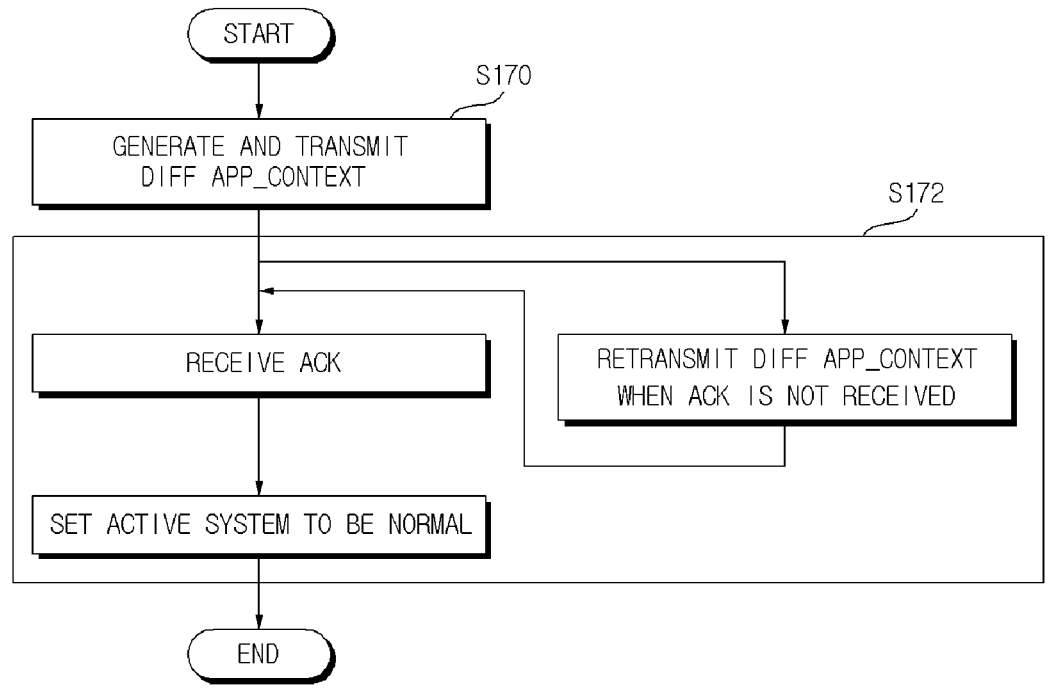
FIG. 8 is a flowchart illustrating an operating method for diff app context transmission illustrated in FIG. 1.
Figure 9:
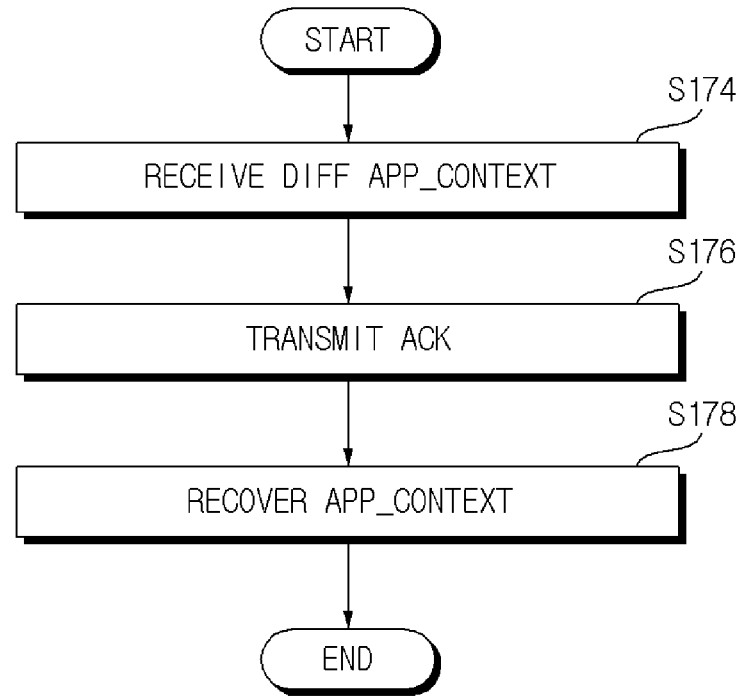
FIG. 9 is a flowchart illustrating an operating method for handling a diff app context and an app context in the second processor illustrated in FIG. 1.
Figure 10:
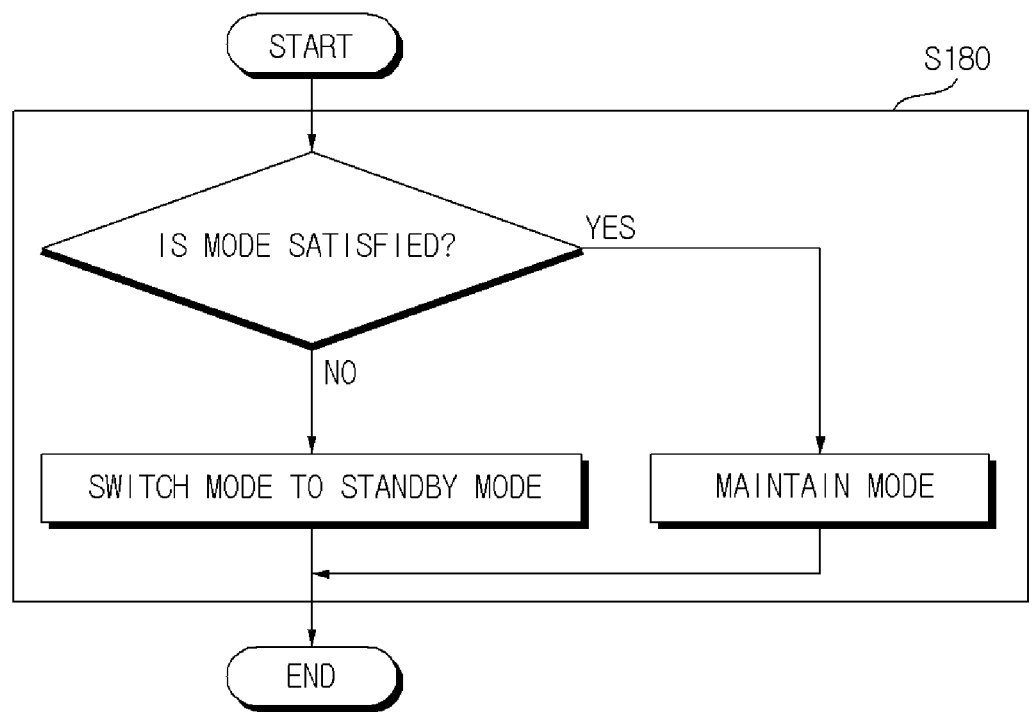
FIG. 10 is a flowchart illustrating an operating method for mode switching between the first and second processors illustrated in FIG. 1.
Figure 11:
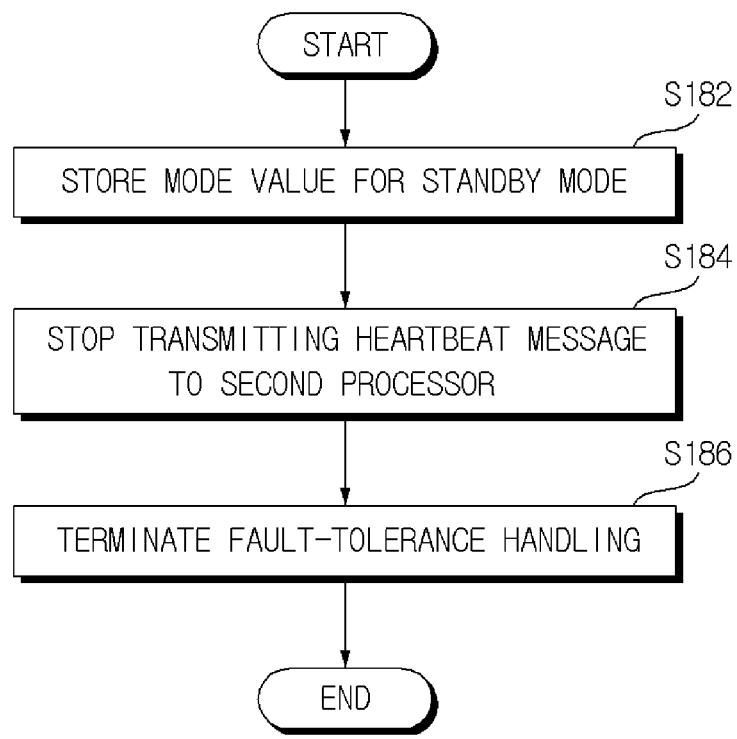
FIG. 11 is a flowchart illustrating an operating method for mode switching in the first processor illustrated in FIG. 1.
Figure 12:
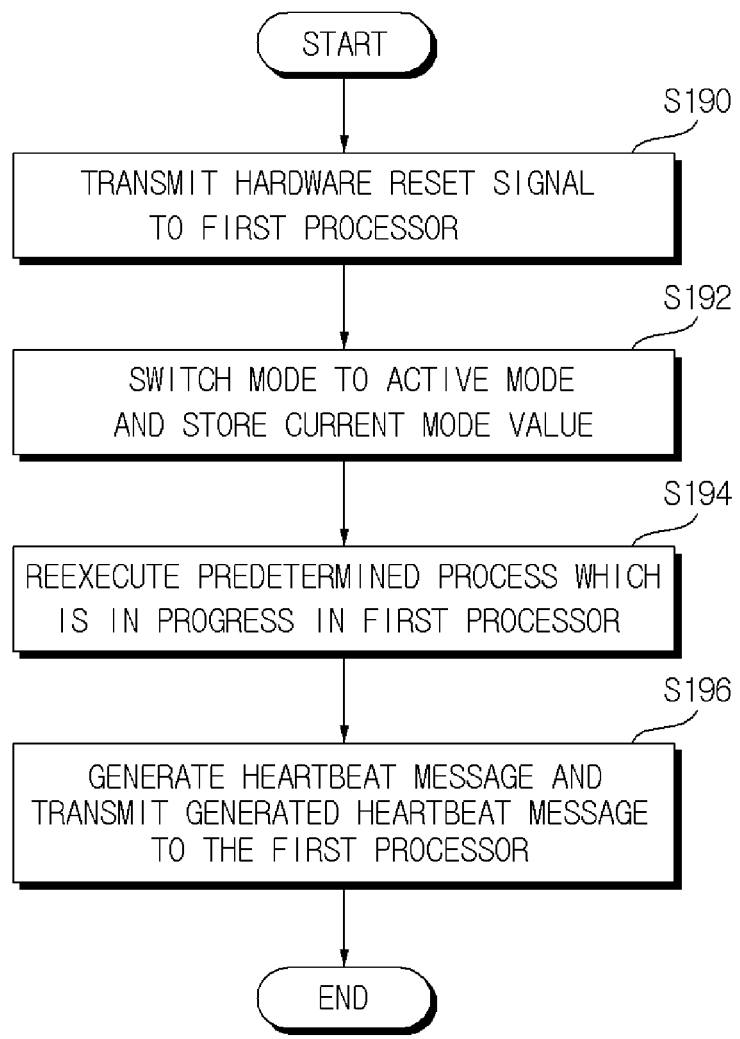
FIG. 12 is a flowchart illustrating an operating method for mode switching in the second processor illustrated in FIG. 1.

FIG. 1 is a flowchart schematically illustrating an operating method of a software fault-tolerant handling system according to an exemplary embodiment. FIG. 2 is a flowchart, in detail, illustrating an operating method for mode setting of a first processor illustrated in FIG. 1. FIG. 3 is a flowchart illustrating an operating method for mode setting of a second processor illustrated in FIG. 1. FIG. 4 is a flowchart illustrating an operating method for monitoring and message handling in the first processor illustrated in FIG. 1. FIG. 5 is a flowchart illustrating an operating method for a monitoring step illustrated in FIG. 4. FIG. 6 is a flowchart illustrating an operating method for monitoring and message handling in a second processor illustrated in FIG. 1. FIG. 7 is a flowchart illustrating an operating method for checkpoint handling illustrated in FIG. 1. FIG. 8 is a flowchart illustrating an operating method for diff app context transmission illustrated in FIG. 1. FIG. 9 is a flowchart illustrating an operating method for handling a diff app context and an app context in the second processor illustrated in FIG. 1. FIG. 10 is a flowchart illustrating an operating method for mode switching between the first and second processors illustrated in FIG. 1. FIG. 11 is a flowchart illustrating an operating method for mode switching in the first processor illustrated in FIG. 1. FIG. 12 is a flowchart illustrating an operating method for mode switching in the second processor illustrated in FIG. 1.

Referring to FIGS. 1 to 12, the operating method of the software fault-tolerance handling system may set the first processor in an active mode and set the second processor in a standby mode according to a setting reference in the first and second processors (S110).

That is, the software fault-tolerance handling system may perform software-type fault-tolerance handling in a system environment constituted by primary and backup processors.

In the exemplary embodiment, the first processor is set in the active mode and the second processor is set in the standby mode, but the first processor may be set in the standby mode and the second processor may be set in the active mode according to a setting reference to be described below and the present invention is not limited thereto.

Herein, referring to FIG. 2, the processor 1 calculates a first mode corresponding to an initial mode value calculated based on an init material stored in a memory (S112) and transmits a command to request a current mode value of the second processor to the second processor to receive the current mode value and calculate a second mode of the second processor (S114).

Further, the first processor sets the modes of the first and second processors based on the calculated first and second modes and setting reference (S116).

That is, the first processor may include the initial mode value included in the init material stored in the memory, for example, init material (init.cfg) "mode=Active", "mode_time=5", "hb_tim=1", and "hold_time=5" and calculate the first mode which is the active mode as the initial mode value according to "mode=Active".

In this case, the first processor may calculate (extract) the second mode based on the current mode value transmitted from the second processor from an init material of the second processor as described above.

Herein, in the setting reference, when the first and second modes are the active mode, the first and second modes are the standby mode, or the first mode is the standby mode and the second mode is the active mode, the first processor may be set in the standby mode and the second processor may be set in the active mode, and when the first mode is the active mode and the second mode is the standby mode, the first processor may be set in the active mode and the second processor may be set in the standby mode.

In the exemplary embodiment, as described above, it is described that the first processor is set in the active mode and the second processor is set in the standby mode.

Herein, when the first and second modes are the active mode, the first mode of the first processor is switched to the standby mode, and the active system is set to be faulty and thus, sleeps as long as "mode_time=5" included in the init material and thereafter, the process is repeatedly executed.

Further, when the first and second modes are the standby mode, the first processor transmits a command signal to request switching to the active mode to the second processor and sleeps as long as "mode_time=5" included in the init material as described above and thereafter, the process is repeatedly performed.

Besides, the first processor sleeps as long as "mode_time=5" included in the init material as described above at the time when the first processor is maintained in the first mode, and thereafter, repeatedly performs the process.

Herein, referring to FIG. 3, the second processor calculates the second mode corresponding to the current mode value calculated based on the init material stored in the memory (S122) and transmits the current mode value to the first processor at the time of receiving the command from the first processor (S124).

Thereafter, the second processor may set the second mode to the active mode or the standby mode at the time of receiving the command requested by the first processor (S126).

That is, the second processor may convert or maintain the current mode value and the second mode according to the command signal for the request of the first processor as described in FIG. 2.

Referring back to FIG. 1, after the mode setting step in the first and second processors (S110), a self healing function to recover a system error which occurs in the first processor is performed (S130) or a heartbeat message is transmitted to the second processor when the system error does not occur (S132).

Herein, referring to FIG. 4, the first processor executes system health monitoring for detecting the system error based on "hb_time=1" in the init material stored in the memory (S134).

In this case, referring to FIG. 5, in the system health monitoring step (S134), a health event associated with the system error for a predetermined process which is being executed is collected (S142).

The first processor verifies whether system errors such as a memory overload, a CPU overload, a main application execution error, a system state verification error, and an OS kernel fault among the health event occur and thereafter, may perform the self healing function in which self recovery handling may be performed (S144).

In this case, the first processor sets the active system to be faulty in the case of a fault, in which the self recovery processing is impossible, and thus the self healing function is not performed, among the system errors, for example, the OS kernel fault (S146) and the process is returned to step S130 in the case of a fault in which the self healing function is performed.

Further, the first processor verifies that the active system is normal when the health event does not occur.

Herein, [Table 1] and [Table 2] schematically illustrate the aforementioned system error and recovery method.

TABLE 1

| OS kernel system health monitoring | Contents | Sensing | Recovery method |
|---|---|---|---|
| OS panic | Control of kernel is turned over to unlimited loop execution due | Sensing according to whether panic function of kernel is | Rebooting or mode switching |

TABLE 1-continued

| OS kernel system health monitoring | Contents | Sensing | Recovery method |
|---|---|---|---|
| | to faulty of device | called | |
| Loop file system is faulty | Problem occurs in accessing file system in kernel | Periodically checking whether or not to access primary file in loop file system | Rebooting or mode switching |
| Text code crash | text code area where change is prevented is deformed | Diagnosing whether error occurs by using checksum value of text code | Rebooting or mode switching |
| Kernel scheduler watchdog error | Kernel scheduler is not operated | Sensing in interrupt service routine of watchdog timer | Rebooting or mode switching |
| Page assignment is faulty | Problem occurs in request of page assignment in OS level for generating application process | Sensing in page assignment fault function | Rebooting or mode switching |
| Unknown fault | Other unknown faults different from above items | Sensing based on whether die function of kernel is called | Rebooting or mode switching |

[Table 1] illustrates an exemplary embodiment for detecting the OS kernel fault.

That is, when the OS kernel fault as illustrated in [Table 1] is discovered in the system health monitoring, the active mode of the first processor may be switched to the standby mode.

TABLE 2

| Application level system health | Contents | Sensing | Recovery method |
|---|---|---|---|
| Memory overload | When memory, which is more than reference value, is used by application process | Sensing by sum of quantity of used memory of processes in kernel | Self healing using memory overload killer |
| CPU overload | When problem occurs in accessing file system in kernel | Sensing by sum of CPU occupying rates of processes in kernel | Self healing through main system state recovering function |
| Error in executing main application | When text code area where change is prevented is deformed | Check whether main application process operates | Self healing through reexecution of main application |
| Error in verifying system state | When kernel scheduler is not operated | Sensing as fault when state different from anticipated main system | Self healing through main system state recovering function |

[Table 2] illustrates a fault for which the self healing function may be performed as illustrated in FIG. 5.

Referring back to FIG. 4, the first processor determines whether the active system fault occurs (S136) after the system health monitoring step (S134) and when it is determined that the active system fault does not occur, the first processor transmits the heartbeat message to the second processor and when it is determined that the active system fault occurs, the processor sleeps as long as "hb_time=1" in the init material (S138).

FIG. 6 illustrates an operation associated with receiving the heartbeat message from the first processor and whether the active system fault occurs while the second processor operates in the standby mode in the monitoring and message handling step.

When the second processor receives the heartbeat message from the first processor, the second processor determines whether the process is a parent process or a child process (S150).

As a result of the determination in step S150, when the process is the parent process, the second processor sleeps by using "hold_time=5" in the init material provided from the first processor (S152) and checks whether heartbeat_flag is set to 1 (S154), and as a checking result, when heartbeat_flag is set to 1, the second processor resets heartbeat_flag to 0 and sets the active system not to be faulty (S156).

Herein, as the determination result of step S150, when the process is the child process, the second processor sets heartbeat_flag to 1 with respect to the heartbeat message provided from the first processor and when the heartbeat message is not received within "hold_time=5' in the init material, the second processor sets the active mode system to be faulty (S158).

Referring back to FIG. 1, after the transmission step (S132), checkpoint handling is performed, in which a basic app_context for a predetermined process which is being executed in the first processor and a diff app_context for an app_context at a current time are generated and transmitted to the second processor (S160), and it is determined whether the fault occurs in the active system of the first processor and when it is determined that the active system is fault, the modes of the first and second processors are switched and when the active system is not fault, the process is returned to step S160 and after the mode of the first and second processors are switched, the process may be returned to step S160 or terminated depending on whether the system is terminated (S200).

Herein, referring to FIG. 7, when operating in the active mode, the first processor executes the application processes (S162).

In this case, the basic app_context for a predetermined process among the application processes which are being executed and the diff app_context for the app_context at the current time are generated by using an app_context generation tool and transmitted to the second processor (S164).

The first processor transmits the diff app_context to the second processor and thereafter, determines whether the active system is faulty (S166), and when the active system is not faulty in step S166, the first processor sleeps for a set time or when the active system is fault, the active mode is switched to the standby mode (S168).

Further, referring to FIG. 8, the diff app_context transmission step (S164) illustrated in FIG. 7 will be described in detail.

That is, the first processor generates the diff app_context between the basic app_context and the app_context at the current time by using a binary diff (S170).

In addition, when the first processor transmits the diff app_context to the second processor and thereafter, receives an ACK message from the second processor, the first processor sets the active system not to be faulty (S172).

When the second processor does not receive the ACK, the second processor retransmits the diff app_context and step S170 is repeated. When the ACK is not received three times or more, the second processor sets the active system to be fault.

Referring to FIG. 9, when the second processor receives the diff app_context from the first processor (S174), the second processor transmits the ACK message to the first processor (S176) and recovers the app_context by using a binary diff patch (S178).

Referring to FIG. 10, when a current state of the first processor meets a set reference, the mode of the first processor is switched to the standby mode and the mode of the second processor is switched to the active mode to continuously execute the predetermined process (S180).

That is, when the current state of the first processor meets the set reference, the first processor operates in the standby mode from the active mode and when the current state does not meet the reference, the first processor may be maintained in the active mode.

In the exemplary embodiment, the case in which the first processor is in the active mode is described, but when the current state that is the standby mode meets the reference, the mode of the first processor may be switched to the active mode.

Herein, referring to FIG. 11, when the current state meets the reference, the first processor stores the mode in a flash memory as a mode value for the standby mode (S182), the heartbeat message stops by the second processor (S184), and the fault-tolerance handling is terminated (S186).

In this case, referring to FIG. 12, when the heartbeat message stops in the first processor, the second processor transmits a hardware reset signal to the first processor (S190), switches the standby mode to the active mode and stores a current mode value in the flash memory (S192), reexecutes the predetermined process which is in progress in the first processor (S194), and generates the heartbeat message and transmits the generated heartbeat message to the first processor (S196).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An operating method of a software fault-tolerance handling system, comprising:

setting a mode of a first processor to an active mode and a mode of a second processor to a standby mode between the first and second processors in accordance with a setting reference;

performing a self healing function to recover a system error which occurs in the first processor or transmitting a heartbeat message to the second processor when the system error does not occur;

generating a diff app_context between a basic app_context for a predetermined process which is being executed in the first processor and an app_context at a current time and transmitting the generated diff app_context to the second processor, after the transmission; and switching the mode of the first processor to the standby mode and switching the mode of the second processor to the active mode when a current state of the first processor meets a set reference to continuously execute the predetermined process, at the time of transmitting the diff app_context, wherein:

the mode setting includes, calculating a first mode corresponding to an initial mode value calculated based on an init material stored in a memory of the first processor and calculating a second mode corresponding to a current mode value transmitted from the second processor; and setting the modes of the first and second processors based on the first and second modes and the first setting reference.

2. The operating method of a software fault-tolerance handling system of claim 1, wherein:

in the setting reference, when the first mode is the active mode and the second mode is the standby mode, the mode of the first processor is set to the active mode and the mode of the second processor is set to the standby mode.

3. The operating method of a software fault-tolerance handling system of claim 1, wherein:

in the setting reference, when the first and second modes are the active mode, the first and second modes are the standby mode, or the first mode is the standby mode and the second mode is the active mode, the mode of the first processor is set to the standby mode and the mode of the second processor is set to the active mode.

4. The operating method of a software fault-tolerance handling system of claim 1, wherein:

the transmitting includes, determining whether the system error occurs;

verifying whether the self healing function is executed when the system error occurs;

transmitting the heartbeat message to the second processor when the system error does not occur and the self healing function is executed; and determining, by the first processor, that an active system is faulty and stopping the heartbeat message, when the self healing function is not executed.

5. The operating method of a software fault-tolerance handling system of claim 1, wherein:

in the checkpoint handling, the diff app_context configured by a state change checkpoint between the basic app_context and the app_context is generated.

* * * * *